United States Patent
Owen et al.

(10) Patent No.: US 10,539,066 B1
(45) Date of Patent: Jan. 21, 2020

(54) VEHICLE CHARGE AIR COOLER WITH AN INTEGRATED RESONATOR

(71) Applicant: GM GLOBAL TECHNOLOGY OPERATIONS LLC, Detroit, MI (US)

(72) Inventors: Shawn M. Owen, Ortonville, MI (US); Michael L. Kociba, Hartland, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 16/197,437

(22) Filed: Nov. 21, 2018

(51) Int. Cl.
*F02B 29/04* (2006.01)
*F02M 35/12* (2006.01)
*F02M 35/10* (2006.01)

(52) U.S. Cl.
CPC ... *F02B 29/0475* (2013.01); *F02M 35/10268* (2013.01); *F02M 35/1255* (2013.01); *F02M 35/1288* (2013.01); *F02M 35/10157* (2013.01)

(58) Field of Classification Search
CPC .............. F02B 29/0475; F02B 29/0425; F02B 29/0406; F02B 29/045; F02B 29/0456; F02M 35/10268; F02M 35/1255; F02M 35/1288
See application file for complete search history.

(56) References Cited

U.S. PATENT DOCUMENTS

| 2013/0092472 A1* | 4/2013 | Ostler | F02M 35/1216 181/256 |
| 2018/0231028 A1* | 8/2018 | Gautam | F02B 33/44 |

* cited by examiner

*Primary Examiner* — Jacob M Amick
(74) *Attorney, Agent, or Firm* — Cantor Colburn LLP

(57) ABSTRACT

A vehicle charge air cooler of a vehicle engine air induction system. The vehicle engine air induction system could also be equipped with a turbocharger or a supercharger located upstream of the vehicle charge air cooler. The vehicle charge air cooler has an inlet housing. The inlet housing includes an inlet chamber and a resonator chamber. The inlet housing includes an inlet chamber and at least one resonator chamber. The inlet chamber is defined by an exterior wall of the inlet housing and at least one in interior wall disposed within the inlet housing. The resonator chamber includes an insulation material, an exterior wall region, and an interior wall wherein the insulation material is disposed between the interior and exterior walls. The interior wall defines at least one aperture and divides the resonator chamber from the inlet chamber. The insulating material is configured to attenuate sound waves.

16 Claims, 3 Drawing Sheets

VEHICLE CHARGE AIR COOLER WITH AN INTEGRATED RESONATOR

INTRODUCTION

The present disclosure relates to vehicle engine air induction systems, and more particularly relates to charge air coolers and resonators employed in vehicle engine air induction systems.

Vehicle engine air induction systems are commonly equipped in automobiles to assist in the supply of air into cylinders of internal combustion engines. Superchargers and turbochargers can be provided as components in vehicle engine air induction systems to force air into the cylinders and hence improve engine efficiency. Additional components in vehicle engine air induction systems commonly include resonators and charge air coolers. The resonators reduce the sound level of the forced air before the air is supplied to the cylinders, and the charge air coolers reduce the temperature of the forced air before the air is supplied to the cylinders. The resonators and charge air coolers are typically furnished as discrete components at locations downstream of the superchargers and turbochargers. And with respect to each other, the resonators are typically installed at a location that is upstream of the charge air coolers.

SUMMARY

In an embodiment, a vehicle charge air cooler may include an inlet housing. The inlet housing has an inlet chamber and a resonator chamber. The inlet chamber is defined by a first wall region of the inlet housing and by an interior wall of the inlet housing. The resonator chamber includes a layer of insulating material which is disposed between the aforementioned interior wall of the inlet housing and is a second wall region of the inlet housing. The interior wall separates the inlet chamber and the resonator chamber from each other wherein the interior wall has one or more apertures residing therein. The aperture(s) in the interior wall span between the inlet chamber and the resonator chamber. The insulating material is configured to attenuate sound waves which may pass through the aperture(s) defined in the interior wall.

In an embodiment, the vehicle charge air cooler may further include a heat exchanger and an outlet housing. The heat exchanger is situated downstream of the inlet housing and the outlet housing is situated downstream of the heat exchanger.

In an embodiment, the interior wall constitutes a wall disposed within the inlet housing. The first wall region and second wall region constitute exterior walls of the inlet housing.

In an embodiment, the interior wall serves to partition the inlet chamber and the resonator chamber from each other. The interior wall extends between the first wall region and the second wall region.

In an embodiment, the resonator chamber resides downstream of an inlet of the inlet housing. The resonator chamber further resides upstream of a heat exchanger of the vehicle charge air cooler.

In an embodiment, the interior wall confronts the heat exchanger of the vehicle charge air cooler across the inlet chamber. The resonator chamber receives sound waves reflected off of a confronting face of the heat exchanger.

In an embodiment, the resonator chamber receives sound waves that travel downstream of an inlet of the inlet housing.

In an embodiment, the inlet housing includes one resonator chamber. However, in another embodiment the inlet housing may include multiple resonator chambers disposed in various regions of the inlet housing. In this arrangement, the resonator chambers may be disposed in various ways: (1) adjacent to one another; (2) across from each other within the inlet housing—vertically or horizontally; and/or (3) disposed on inlet housing walls which are substantially perpendicular to one another. Regardless of the various embodiments of the present disclosure, each resonator chamber includes insulating material.

In an embodiment, a vehicle engine air induction system includes the vehicle charger air cooler.

In an embodiment, the resonator chamber(s) of the inlet housing constitute the sole resonator of the vehicle engine air induction system downstream of a turbocharger of the vehicle engine air induction system.

In an embodiment, the vehicle engine air induction system lacks a discrete resonator component downstream of a turbocharger of the vehicle engine air induction system.

In an embodiment, a vehicle charge air cooler may include an inlet housing, a heat exchanger, and an outlet housing. The inlet housing has an inlet chamber and at least one interior resonator chamber defined within the inlet housing. The inlet chamber and the resonator chamber are partitioned from each other by way of an interior wall of the inlet housing. The inlet chamber receives airflow from an inlet of the inlet housing. The resonator chamber resides downstream of the inlet of the inlet housing. The heat exchanger is situated downstream of the inlet housing. And the outlet housing is situated downstream of the heat exchanger.

In an embodiment, the inlet chamber is defined by a first exterior wall region of the inlet housing, and is defined by the interior wall of the inlet housing.

In an embodiment, the resonator chamber is defined by a second exterior wall region of the inlet housing and the interior wall of the inlet housing together with insulating material disposed between the second exterior wall and the interior wall having at least one aperture defined therein.

In an embodiment, the interior wall of the inlet housing extends between exterior walls of the inlet housing and is disposed entirely within the inlet housing.

In an embodiment, the interior wall has multiple apertures that reside in the interior wall. The apertures span between the inlet chamber and the resonator chamber.

In an embodiment, a vehicle engine air induction system includes the vehicle charge air cooler.

In an embodiment, a vehicle charge air cooler may include an inlet housing and a heat exchanger. The inlet housing has an inlet chamber and a resonator chamber. The inlet chamber is defined by an exterior wall of the inlet housing and is defined by an interior wall of the inlet housing. The resonator chamber includes an insulation layer together with an exterior wall of the inlet housing and an interior wall of the inlet housing wherein the insulation layer is disposed between the interior wall and the exterior wall. The resonator chamber resides downstream of an inlet of the inlet housing. The inlet chamber and the resonator chamber are partitioned from each other by way of the interior wall of the inlet housing. The interior wall has multiple apertures that reside in the interior wall. The apertures span between the inlet chamber and the resonator chamber. The heat exchanger is situated downstream of the inlet housing.

BRIEF DESCRIPTION OF THE DRAWINGS

One or more aspects of the disclosure will hereinafter be described in conjunction with the appended drawings, wherein like designations denote like elements, and wherein.

DETAILED DESCRIPTION

With reference to the figures, a vehicle engine air induction system 10 is equipped with a vehicle charge air cooler (CAC) 12 having the functionality of a resonator integrated into the design and construction of the charge air cooler 12. A discrete resonator component—typically installed immediately upstream of a CAC in past systems and intended for higher pressures—hence need not be provided in the engine air induction system 10. Rather, the sound level reduction effect of the discrete resonator component is incorporated into the charge air cooler 12. As a result, the charge air cooler 12 more readily satisfies packaging demands which can oftentimes be inflexible in automotive applications. Indeed, the charge air cooler 12 and its resonator functionality optimizes packaging and removes design and construction constraints otherwise in place with a discrete resonator component, so that enhanced air flow uniformity through the charge air cooler 12 can be executed. Yet other advancements, depending on the particular application, may include minimizing joints and potential leak paths in the vehicle engine air induction system 10, facilitation of manufacturing and assembly operations, reduced overall weight, and decreased overall costs. The charge air cooler 12 is described below in the context of an automotive application, yet could be equipped in non-automotive applications as well.

As used herein, the terms downstream and upstream are employed with reference to air flow traveling through the charge air cooler 12, such that downstream refers to a direction with air flow travel, and upstream refers to a direction that is opposite or against the direction of air flow travel.

Figure 1:
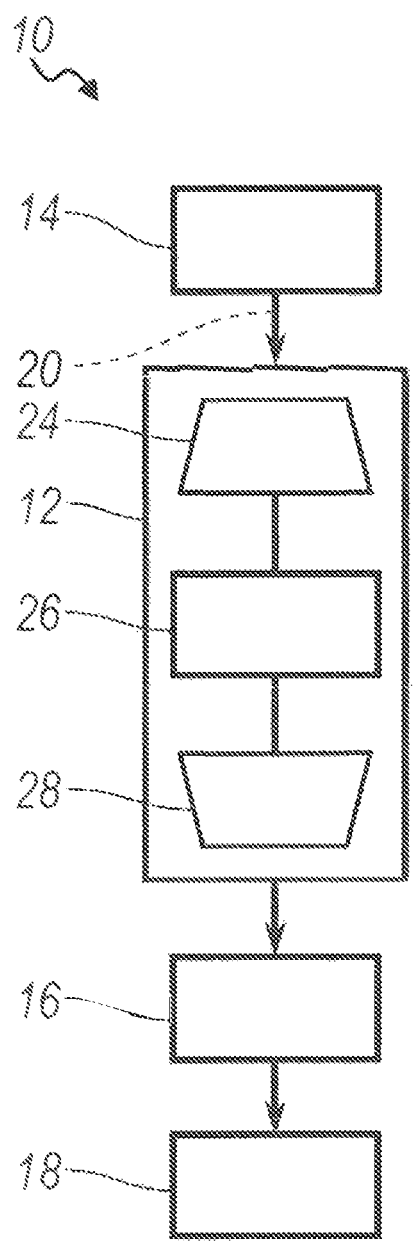
FIG. 1 is a schematic depiction of an embodiment of a vehicle engine air induction system.

The engine air induction system 10 supplies air into internal combustion engine cylinders. In the example of FIG. 1, the engine air induction system 10 includes a turbocharger 14 that compresses air, the charge air cooler 12, engine air delivery components 16 such as a throttle body and an intake manifold, and an internal combustion engine 18; still, the system could include more, less, and/or different components in other examples such as a supercharger component in lieu of the turbocharger component. Air is forced to travel from the turbocharger 14 and ultimately to the internal combustion engine 18 amid operation of the engine air induction system 10. Absent from the engine air induction system 10 of FIG. 1 is a discrete resonator component which previously might be installed at a location 20 downstream of the turbocharger 14 and upstream of the charge air cooler 12 and between the two components.

The charge air cooler 12 lowers the temperature of forced air that passes through it and before the air makes its way to the internal combustion engine 18. Removing heat from the forced air increases the density of the air and improves the efficiency and effectiveness of the internal combustion engine 18. Unlike previously-known charge air coolers, the charge air cooler 12 has a resonator chamber 22 built into its structure. In this way, the functionalities of reduced sound levels and reduced temperatures are combined into a single device. The charge air cooler 12 can have various designs, constructions, and components in different embodiments depending upon—among other possible factors—the designs and constructions and components of upstream and downstream regions of the engine air induction system 10, and the intended magnitude of sound level reduction. In the embodiment presented by FIGS. 2 and 3, the charge air cooler 12 has an inlet housing 24, a heat exchanger 26, and an outlet housing 28.

Figure 3:
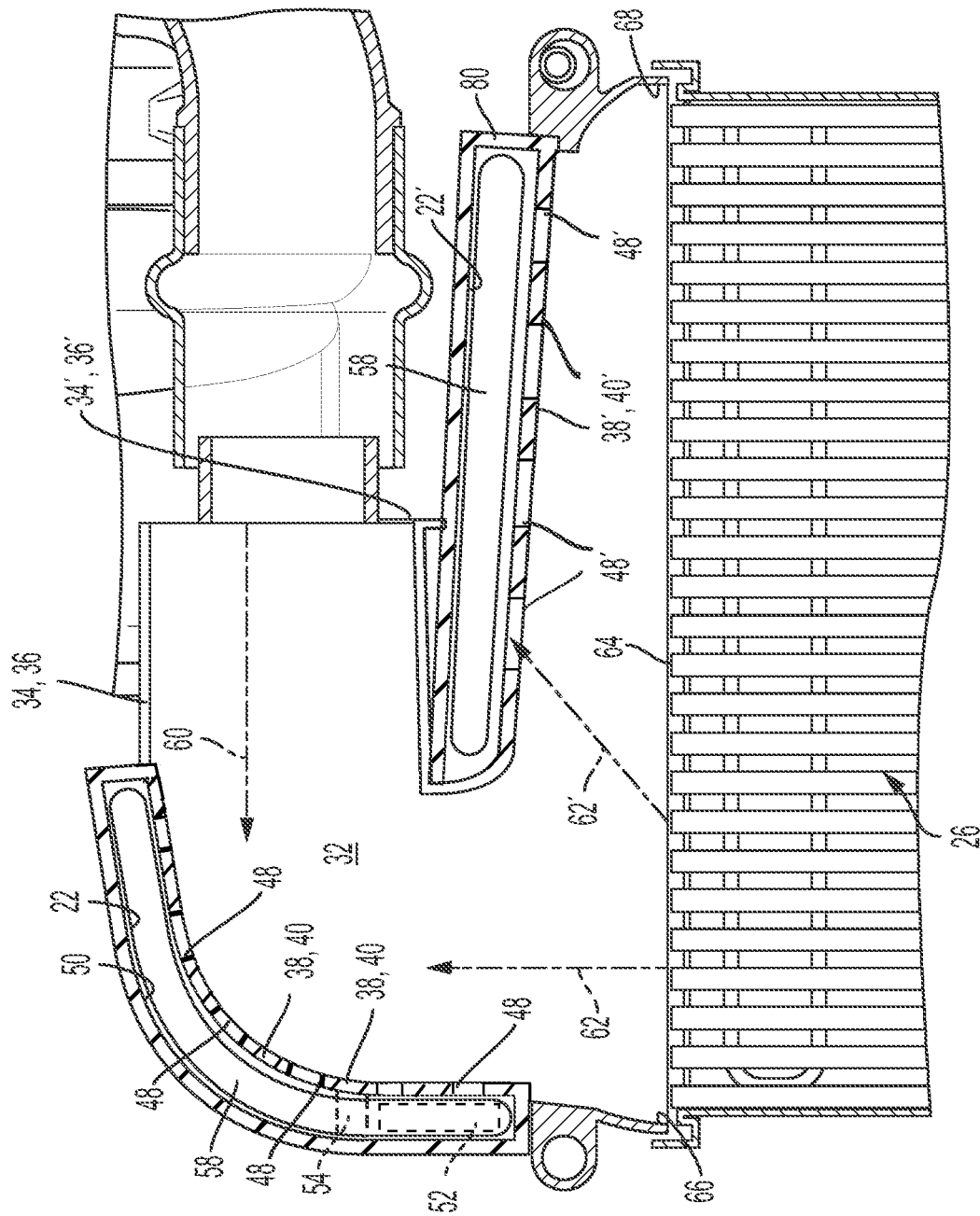
FIG. 3 is an enlarged view the vehicle charge air cooler, the resonator chamber and the secondary resonator chamber of FIG. 2.

The inlet housing 24 receives forced air flow immediately downstream of the turbocharger 14 and directs the air flow to the heat exchanger 26. The inlet housing 24 can have different designs and constructions in different embodiments. With particular reference to FIG. 3, the inlet housing 24 in this embodiment has an inlet 30, an inlet chamber 32, and the resonator chamber 22. The inlet 30 is an opening in the inlet housing 24 that fluidly communicates with upstream components for initial receipt of entering air flow into the inlet chamber 32. The inlet chamber 32 constitutes the main area of the inlet housing 24 that receives air flow. A first wall region 34 partly defines and bounds the inlet chamber 32. In the embodiment presented here, the first wall region 34 is also a first exterior wall region 36 of the inlet housing 24. Further, a interior wall 38 partly defines and bounds the inlet chamber 32. Unlike the first wall region 34, the interior wall 38 in this embodiment is also an interior wall 40 of the inlet housing 24. The interior wall 40 depends from an inner surface 42 of the inlet housing 24 and primarily resides inside of the inlet housing 24. Together, the first wall region 34 and interior wall 38 form a portion of the structural boundaries of the inlet chamber 32.

The resonator chamber 22 attenuates the sound level produced by forced air flow traveling through the inlet housing 24 and interacting with the insulation material 58 disposed within the resonator chamber 22. The resonator chamber 22 resides at a location that is downstream of a location of the inlet 30. A second wall region 44 partly defines and bounds the resonator chamber 22. In this embodiment, the second wall region 44 is also a second exterior wall region 46 of the inlet housing 24. Indeed, in this embodiment, the first and second exterior wall regions 36, 46 are sections (or regions) of a larger monolithic exterior wall of the inlet housing 24. The interior wall 40 also partly defines and bounds the resonator chamber 22. Together, the second exterior wall region 46 and the interior wall 40 make-up a double-walled portion of the inlet housing 24 and form the structural boundaries of the resonator chamber 22.

For effecting the resonator function, the interior wall 40 has multiple apertures 48 residing in its structure and spanning between the resonator chamber 22 and the inlet chamber 32. In a sense, the interior wall 40 serves to partition and divide what would otherwise be a larger chamber into two separate chambers, the inlet chamber 32 and the resonator chamber 22. The interior wall 40 can be a unitary extension of other walls of the inlet housing 24, or can initially be constructed as a distinct structure that is subsequently attached to the other walls of the inlet housing 24 such as by welding. Depending on its form, the interior wall 40 can be constructed via injection molding processes, additive manufacturing techniques like three-dimensional (3D) printing, or another fabrication process. In yet further embodiments not depicted by the figures, the resonator chamber 22 could include various sub-chamber arrangements (e.g., two sub-chambers 50, 52 as shown in phantom in FIG. 3, three sub-chambers, etc.) depending on the intended frequencies of sound level attenuation; also, the resonator chamber 22 could have other additional or alternative locations such as, but not limited to secondary resonator chamber 22' defined in the exterior wall opposite the resonator chamber 22. Accordingly, the inlet housing for the charge air cooler may implement resonator 22 or secondary resonator chamber 22' or both. It is also understood resonator chambers 22, 22' having insulation material 58 may also (or alternatively) be provided on the top and/or bottom sides of the inlet housing 24 as well as the side surfaces. Thus, the side surface(s) of the inlet housing may have resonator chamber(s) 22, 22' are in addition to the resonator chambers 22, 22' on the top and/or bottom or in alternative to the chamber(s) 22, 22' defined on top and/or bottom sides.

The secondary resonator chamber 22' may optionally be added with resonator chamber 22. Alternatively, secondary resonator chamber 22' may solely be implemented in inlet housing without the use of resonator chamber 22. Similar to resonator chamber 22, secondary resonator chamber 22' attenuates the sound level produced by forced air flow traveling through the inlet housing 24 wherein the sound waves 62' may interact with the insulation material 58 disposed within the secondary resonator chamber 22'. The resonator chamber 22' resides at a location that is downstream of a location of the inlet 30 and optionally may reside at a location which is also downstream of resonator chamber 22'. A second wall region 80 partly defines and bounds the resonator chamber 22. In this embodiment, the second wall region 80 is also a second exterior wall region 82 of the inlet housing 24. Indeed, in this embodiment, the first and second exterior wall regions 34', 36' are sections (or regions) of a larger monolithic exterior wall of the inlet housing 24—disposed on the side opposite to first and second exterior wall regions 34, 36. The interior wall 40' of the secondary resonator chamber 22' also partly defines and bounds the secondary resonator chamber 22'. Together, the second exterior wall region 80 and the interior wall 40' make-up a double-walled portion of the inlet housing 24 and form the structural boundaries of the secondary resonator chamber 22'.

For effecting the resonator function, the interior wall 40' also similarly has multiple apertures 48' residing in its structure and spanning between the secondary resonator chamber 22' and the inlet chamber 32—in which all of the chambers of the present disclosure are open chambers. In a sense, the interior wall 40' serves to partition and divide what would otherwise be a larger chamber into multiple separate chambers, the inlet chamber 32 and the resonator chamber 22 and/or secondary resonator chamber 22'. The interior wall 40' of the secondary resonator chamber 22' can be a unitary extension of other walls of the inlet housing 24, or can initially be constructed as a distinct structure that is subsequently attached to the other walls of the inlet housing 24 such as by welding. Depending on its form, the interior wall 40' can be constructed via injection molding processes, additive manufacturing techniques like three-dimensional (3D) printing, or another fabrication process. In yet further embodiments not depicted by the figures, the secondary resonator chamber 22' could include various sub-chamber arrangements (e.g., two sub-chambers 50, 52 as shown in phantom for resonator chamber 22, three sub-chambers, etc.) depending on the intended frequencies of sound level attenuation. The resonator chamber 22 and/or the secondary resonator chamber 22' may be defined on any of the various walls of the inlet housing.

With particular reference to FIG. 3, the secondary resonator chamber 22' and the corresponding insulation material 58 disposed within secondary resonator chamber 22' effects sound level attenuation via receipt of sound waves 60 that are reflected off of a confronting face 64 of the heat exchanger 26 and are attenuated via the insulation material 58 disposed with the corresponding resonator chamber 22, 22'.

In some instances, certain sound waves may experience attenuation on more than a single occasion—upon travel through the inlet 30, and subsequently upon reflection off of the confronting face 64. However sound waves are received, the resonator chamber 22, 22' having insulation material 58 can be tuned to attenuate various frequencies in different embodiments. Measures that can be taken to alter sound level attention include, but are not limited to: the quantity of resonator chambers, the insulation material 58 disposed within each resonator chamber, the volume of resonator chamber(s), the location of resonator chamber(s), the size and quantity and location of apertures in each corresponding interior wall, or a combination of these measures.

Via the resonator chamber 22 and/or secondary resonator chamber 22' (each having insulation material 58 and incorporating the attendant sound level attenuation functionality into the charge air cooler 12, as described), packaging demands are more readily satisfied in certain applications, and especially in automotive applications in the vicinity of an internal combustion engine which can be particularly inflexible and particularly challenging. The packaging requirements introduced by a discrete resonator component are altogether eliminated in the embodiments set forth in this description. This also removes the design and construction constraints that would otherwise be imposed on the vehicle engine air induction system 10 and on the charge air cooler 12 with a discrete resonator component. Removing such constraints allows a design and construction of the charge air cooler 12 that might not otherwise be possible, such as the design and construction of the charge air cooler 12 of the figures. For instance, and referring now to FIG. 2, air flow 70 travels through the inlet chamber 32 and over a greater transverse side-to-side extent for enhanced flow uniformity across the confronting face 64 of the heat exchanger 26. The efficiency and effectiveness of the resulting temperature reduction is thereby improved. Furthermore, the charge air cooler 12 facilitates its manufacture in applications in which the resonator chamber 22 is not needed, since the interior wall 40 can be removed without extensive tooling changes and without altering joints upstream of charge air cooler 12, as might otherwise be necessary in applications with a discrete resonator component.

The heat exchanger 26 is the section of the charge air cooler 12 that provides temperature reduction to the air that flows through the heat exchanger 26. The heat exchanger 26 is situated at a location in the charge air cooler 12 that is downstream of the inlet housing 24 and that is upstream of the outlet housing 28. The heat exchanger 26 can be of different types in different embodiments, and in the example of FIGS. 2 and 3 includes multiple passages and fins for carrying out its temperature reduction functionality. The outlet housing 28 receives air flow exiting the heat exchanger 26 and directs the air flow to the engine air delivery components 16 via an outlet 72 of the charge air cooler 12.

Figure 2:
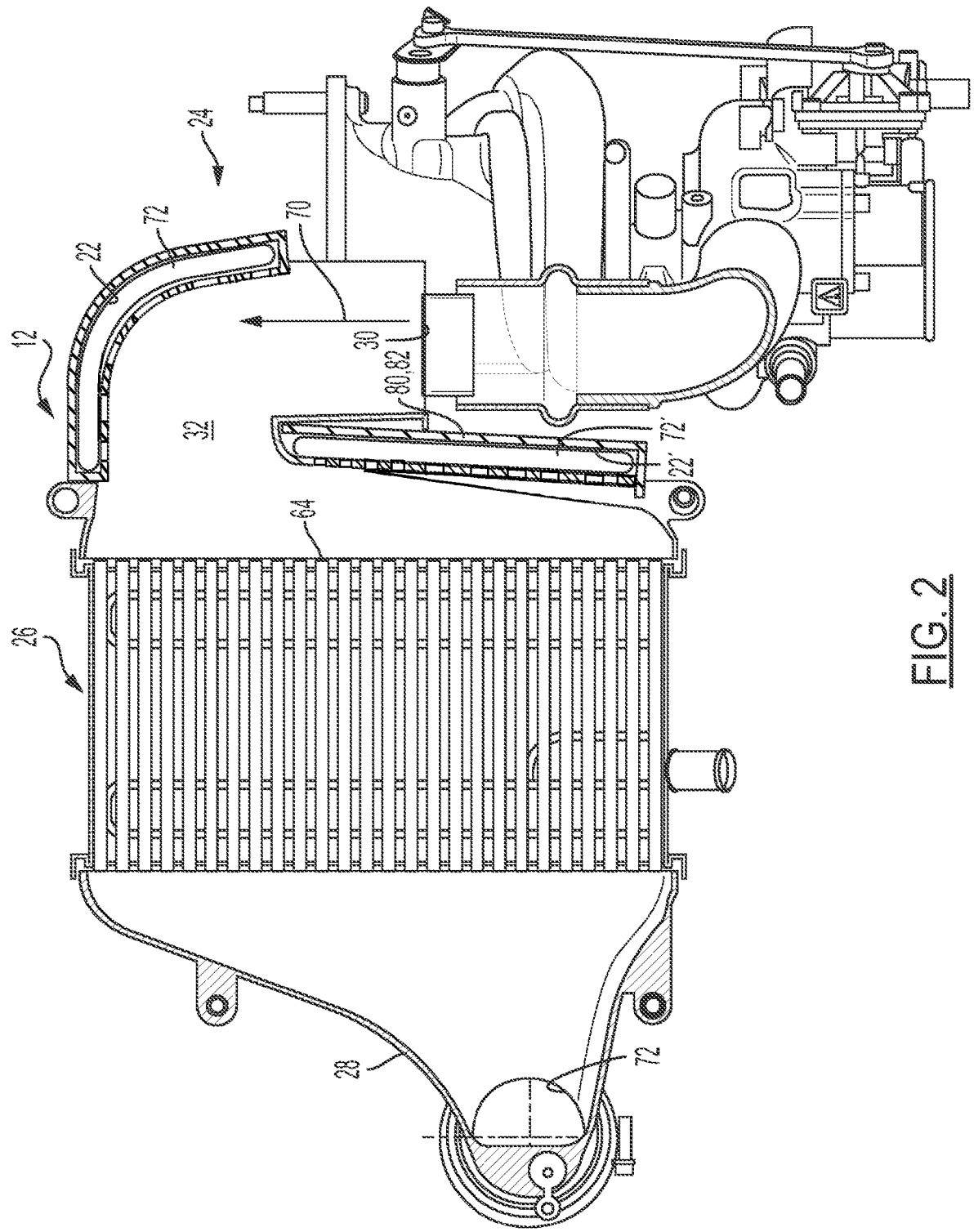
FIG. 2 is a sectional view of an embodiment of a vehicle charge air cooler with a resonator chamber and a secondary resonator chamber (each having insulation material) in the vehicle engine air induction system of FIG. 1.

Therefore, where multiple resonator chambers are implemented within the inlet housing 25, the resonator chambers 22, 22', 50, 52 may be disposed in various ways: (1) adjacent to one another (see elements 50, 52 in FIG. 3) with baffle wall 54 between adjacent resonator chambers 50, 52; (2) across from each other within the inlet housing—vertically or horizontally (see elements 22, 22'); and/or (3) disposed on inlet housing walls which are substantially perpendicular to one another. Regardless of the various embodiments of the present disclosure, each resonator chamber 22, 22' identified in the present disclosure includes insulating material 58 as shown in FIGS. 2-3. Moreover, the insulation material 58 identified throughout the present disclosure may, but not necessarily, be any one or more of the following: polyurethane foam, melamine foam, compression formed resonated fiberglass, and/or polyethylene terephthalate fleece.

It is to be understood that the foregoing is a description of one or more aspects of the disclosure. The disclosure is not limited to the particular embodiment(s) disclosed herein, but rather is defined solely by the claims below. Furthermore, the statements contained in the foregoing description relate to particular embodiments and are not to be construed as limitations on the scope of the disclosure or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "e.g.," "for example," "for instance," "such as," and "like," and the verbs "comprising," "having," "including," and their other verb forms, when used in conjunction with a listing of one or more components or other items, are each to be construed as open-ended, meaning that the listing is not to be considered as excluding other, additional components or items. Other terms are to be construed using their broadest reasonable meaning unless they are used in a context that requires a different interpretation.

What is claimed is:

1. A vehicle charge air cooler, comprising:
    an inlet housing having an inlet chamber and a resonator chamber disposed within the inlet housing;
    a heat exchanger; and
    an outlet housing;
    wherein the inlet chamber is defined by a first wall region of the inlet housing and by an interior wall of the inlet housing, and the resonator chamber is defined by the interior wall of the inlet housing and a second wall region of the inlet housing with an insulation material disposed between the interior wall and the second wall region, the interior wall defines at least one aperture and is configured to separate the resonator chamber from the inlet chamber.

2. The vehicle charge air cooler of claim 1, wherein the heat exchanger is positioned downstream of the inlet housing while the outlet housing is positioned downstream of the heat exchanger.

3. The vehicle charge air cooler of claim 1, wherein the interior wall of the inlet housing is an interior wall, and the first wall region and second wall region are exterior walls of the inlet housing.

4. The vehicle charge air cooler of claim 3, wherein the interior wall serves to partition the inlet chamber and the resonator chamber from each other and extends between the first wall region and the second wall region.

5. The vehicle charge air cooler of claim 1, wherein the resonator chamber resides downstream of an inlet of the inlet housing and resides upstream of a heat exchanger of the vehicle charge air cooler.

6. The vehicle charge air cooler of claim 5, wherein the interior wall confronts the heat exchanger of the vehicle charge air cooler across the inlet chamber, and the insulation material disposed within the resonator chamber receives and attenuates sound waves reflected off of a confronting face of the heat exchanger.

7. The vehicle charge air cooler of claim 1, wherein the insulation material within the resonator chamber is configured to receive and attenuate sound waves traveling downstream of an inlet of the inlet housing.

8. The vehicle charge air cooler of claim 1, wherein the insulation material is formed by any combination of urethane foam, melamine foam, compression formed resonated fiberglass, and/or polyethylene terephthalate fleece.

9. The vehicle charge air cooler of claim 8 wherein a secondary resonator chamber is defined on an opposing wall of the inlet housing.

10. The vehicle charge air cooler of claim 9 wherein the secondary resonator chamber resides downstream of the inlet of the inlet housing and downstream of the resonator chamber.

11. The vehicle charge air cooler of claim 10 wherein the secondary resonator resides upstream of a heat exchanger of the vehicle charge air cooler.

12. A vehicle charge air cooler, comprising:
    an inlet housing having an inlet chamber and a resonator chamber, the inlet chamber and the resonator chamber being partitioned from each other via an interior wall of the inlet housing, the inlet chamber receiving air flow from an inlet of the inlet housing, and the resonator chamber residing downstream of the inlet of the inlet housing;
    a heat exchanger situated downstream of the inlet housing; and
    an outlet housing situated downstream of the heat exchanger;
    wherein the resonator chamber includes an insulation material disposed within the resonator chamber, the resonator chamber and the insulation material being configured to receive and attenuate sound waves within the resonator chamber.

13. The vehicle charge air cooler of claim 12, wherein the inlet chamber is defined by a first exterior wall region of the inlet housing and by the interior wall of the inlet housing.

14. The vehicle charge air cooler of claim 13, wherein the resonator chamber is defined by a second exterior wall region of the inlet housing and by the interior wall of the inlet housing.

15. The vehicle charge air cooler of claim 12 wherein the interior wall extends between exterior walls of the inlet housing.

16. The vehicle charge air cooler of claim 12, wherein the interior wall defines a plurality of apertures residing therein and spanning between the inlet chamber and the resonator chamber.

* * * * *